(12) United States Patent
Karras et al.

(10) Patent No.: US 10,106,214 B2
(45) Date of Patent: Oct. 23, 2018

(54) PUFFER: POP-UP FLAT FOLDING EXPLORER ROBOT

(71) Applicant: CALIFORNIA INSTITUTE OF TECHNOLOGY, Pasadena, CA (US)

(72) Inventors: Jaakko T. Karras, Pasadena, CA (US); Christine Fuller, Pasadena, CA (US); Kalind C. Carpenter, Pasadena, CA (US); Alessandro Buscicchio, Pasadena, CA (US); Carolyn E. Parcheta, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 149 days.

(21) Appl. No.: 15/272,239

(22) Filed: Sep. 21, 2016

(65) Prior Publication Data

US 2017/0088205 A1    Mar. 30, 2017

Related U.S. Application Data

(60) Provisional application No. 62/326,557, filed on Apr. 22, 2016, provisional application No. 62/232,692, filed on Sep. 25, 2015.

(51) Int. Cl.
*B62D 57/02* (2006.01)
*B64C 27/08* (2006.01)
*B64C 39/02* (2006.01)

(52) U.S. Cl.
CPC .............. *B62D 57/02* (2013.01); *B64C 27/08* (2013.01); *B64C 39/024* (2013.01); *B64C 2201/024* (2013.01); *B64C 2201/042* (2013.01); *B64C 2201/162* (2013.01)

(58) Field of Classification Search
CPC ........ B62D 57/02; B62D 57/04; B64C 27/08; B64C 39/024; B64C 2201/024
See application file for complete search history.

(56) References Cited

U.S. PATENT DOCUMENTS

| 4,862,808 A * | 9/1989 | Hedgcoxe ................ B25J 5/007 104/138.2 |
| 6,964,309 B2 * | 11/2005 | Quinn .................. B62D 57/022 180/8.1 |
| 7,249,640 B2 | 7/2007 | Horchler et al. |

(Continued)

OTHER PUBLICATIONS

Sun, X. et al. "Self-folding and Self-actuating Robots: a Pneumatic Approach" 2015 IEEE International Conference on Robotics and Automation; Washington State Convention Center; Seattle, Washington, May 26-30, 2015; pp. 3160-3165.

(Continued)

*Primary Examiner* — Kevin Hurley
*Assistant Examiner* — Michael R Stabley
(74) *Attorney, Agent, or Firm* — Steinfl + Bruno LLP

(57) ABSTRACT

A repeatably reconfigurable robot, comprising at least two printed circuit board (PCB) rigid sections, at least one PCB flexible section coupled to the at least two PCB rigid sections, at least one wheel, hybrid wheel propeller, wheel and propeller, or hybrid wheel screw propeller rotatably coupled to at least one of the at least two PCB rigid sections and at least one actuator coupled to the at least two PCB rigid sections, wherein the at least one actuator folds and unfolds the repeatably reconfigurable robot.

21 Claims, 20 Drawing Sheets

(56) References Cited

U.S. PATENT DOCUMENTS

| | | | |
|---|---|---|---|
| 7,559,385 B1* | 7/2009 | Burt | B60K 7/0007 |
| | | | 180/167 |
| 7,798,264 B2* | 9/2010 | Hutcheson | B25J 5/007 |
| | | | 180/65.1 |
| D626,577 S* | 11/2010 | Carlson | B62D 37/00 |
| | | | D15/199 |
| 7,926,598 B2* | 4/2011 | Rudakevych | B62D 55/06 |
| | | | 180/8.1 |
| D637,217 S* | 5/2011 | Carlson | B62D 37/00 |
| | | | D15/199 |
| 8,083,013 B2* | 12/2011 | Bewley | B62D 37/00 |
| | | | 180/199 |
| 9,061,544 B2* | 6/2015 | Carlson | B62D 57/02 |
| 9,283,681 B2* | 3/2016 | Slawinski | B25J 11/008 |
| 9,522,595 B2* | 12/2016 | Rudakevych | B60K 17/043 |
| 2004/0000439 A1* | 1/2004 | Burt | B60B 15/00 |
| | | | 180/7.1 |
| 2008/0223630 A1* | 9/2008 | Couture | B25J 5/005 |
| | | | 180/9.32 |
| 2010/0152922 A1* | 6/2010 | Carlson | B62D 57/02 |
| | | | 701/2 |
| 2012/0059520 A1* | 3/2012 | Kossett | B60B 1/042 |
| | | | 700/264 |
| 2012/0137862 A1* | 6/2012 | Kossett | B25J 11/0025 |
| | | | 89/1.13 |
| 2012/0185087 A1* | 7/2012 | Kang | B62D 57/024 |
| | | | 700/245 |
| 2012/0319457 A1* | 12/2012 | Jo | B60B 15/10 |
| | | | 301/6.1 |
| 2014/0110183 A1* | 4/2014 | Rudakevych | B60K 7/0007 |
| | | | 180/9.32 |

OTHER PUBLICATIONS

Russo, S. et al. "Soft pop-up mechanisms for micro surgical tools: design and characterization of compliant millimeter-scale articulated structures" IEEE International Conference on Robotics and Automation; Stockholm, Sweden ; May 16-21, 2016; 8 pages.

Baisch, A. et al. "Pop-up Assembly of a Quadrupedal Ambulatory MicroRobot" IEEE International Conference on Intelligent Robots and Systems; Nov. 3-7, 2013; 7 pages.

Felton, S. et al. "A method for building self-folding machines" Science; vol. 345, Issue 6197; Aug. 8, 2014; pp. 644-646.

Birkmeyer, P., et al., "DASH: A dynamic 16g hexapedal robot." *Intelligent Robots and Systems, 2009. IROS 2009. IEEE/RSJ International Conference on* IEEE, 2009. 7 pages.

Buscicchio, A., "Developing and testing of electronics for controlling lightweight flexible origami-inspired robots." Master's Thesis, *Departimento Di Automatica E Informatica Mechatronic Engineering, Polytechnic of Turin*, 2015-2016. 76 pages.

Mintchev, S., et al., "Foldable and Self-Deployable Pocket Sized Quadrotor." ICRA, 2015.

Pullin, A.O., et al., "Dynamic turning of 13 cm robot comparing tail and differential drive." *Robotics and Automation (ICRA), 2012 IEEE International Conference on* IEEE, 2012.

\* cited by examiner

PUFFER: POP-UP FLAT FOLDING EXPLORER ROBOT

CROSS REFERENCE TO RELATED APPLICATIONS

The present application claims priority to U.S. Provisional Patent Application Provisional Patent No. 62/232,692 filed on Sep. 25, 2015, entitled PUFFER: Pop-Up Flat Folding Explorer Robot, the disclosure of which is incorporated herein by reference in its entirety. The present application also claims priority to U.S. Provisional Patent No. 62/326,557, filed Apr. 22, 2016 entitled V1 PUFFER Rigid-Flex PCB Structures, Analysis and Brushless Motor Driver, the disclosure of which is incorporated herein by reference in its entirety.

FEDERALLY SPONSORED RESEARCH OR DEVELOPMENT

The invention described herein was made in the performance of work under NASA contract NNN12AA01C, and is subject to the provisions of Public Law 96-517 (35 USC 202) in which the Contractor has elected to retain title.

TECHNOLOGY

The present disclosure relates generally to repeatably reconfigurable robots. More particularly, an embodiment of the present disclosure relates to robots that self unfold, self fold, self partially unfold and self partially fold.

BACKGROUND

Robots have allowed for a remote presence in environments that may not be accessed directly by humans in a safe manner or to operate in dangerous environments without risk to humans. Examples include robots exploring Mars, conducting long-term remote-sensing in Earth science applications, performing dangerous tasks on battlefields and carrying out decontamination tasks at disaster sites.

The reach of robots in these types of applications may be expanded by increased robot mobility. On Mars, enhanced mobility may enable scientists to access currently unexplored high science-return, high risk features such as steep slopes, cliffs, and confined spaces beneath rock overhangs.

On Earth, expanded mobility may allow scientists to deploy robots in more extreme environments. Improved robot mobility may allow soldiers and law enforcement personnel to dispatch robots into hostile buildings and other urban conflict zones with significant obstacles such as doors, gates and walled-off compounds. First responders may be better able to maneuver robots around obstacles at disaster sites, such as blocked corridors and rubble piles.

SUMMARY

In a first aspect of the disclosure, a repeatably reconfigurable robot, comprising at least two printed circuit board (PCB) rigid sections, at least one PCB flexible section coupled to the at least two PCB rigid sections, at least one wheel rotatably coupled to at least one of the at least two PCB rigid sections and at least one actuator coupled to the at least two PCB rigid sections, wherein the at least one actuator folds and unfolds the repeatably reconfigurable robot. The at least one wheel rotates relative to the rigid PCB.

In a second aspect of the disclosure, a repeatably reconfigurable robot, comprising at least two printed circuit board (PCB) rigid sections, at least one PCB flexible section coupled to the at least two PCB rigid sections, at least one propeller rotatably coupled to at least one of the at least two PCB rigid sections and at least one actuator coupled to the at least two PCB rigid sections, wherein the at least one actuator folds and unfolds the repeatably reconfigurable robot. The at least one propeller rotates relative to the rigid PCB.

In a third aspect of the disclosure, a repeatably reconfigurable robot, comprising at least two printed circuit board (PCB) rigid sections, at least one PCB flexible section coupled to the at least two PCB rigid sections, at least one hybrid wheel propeller rotatably coupled to at least one of the at least two PCB rigid sections and at least one actuator coupled to the at least two PCB rigid sections, wherein the at least one actuator folds and unfolds the repeatably reconfigurable robot.

In a fourth aspect of the disclosure, a repeatably reconfigurable robot, comprising at least two printed circuit board (PCB) rigid sections, at least one PCB flexible section coupled to the at least two PCB rigid sections, at least one propeller rotatably coupled to at least one of the at least two PCB rigid sections, at least one wheel rotatably coupled to at least one of the at least two PCB rigid sections and at least one actuator coupled to the at least two PCB rigid sections, wherein the at least one actuator folds and unfolds the repeatably reconfigurable robot.

A repeatably reconfigurable robot, comprising at least two printed circuit board (PCB) rigid sections, at least one PCB flexible section coupled to the at least two PCB rigid sections, at least one hybrid wheel screw propeller rotatably coupled to at least one of the at least two PCB rigid sections and at least one actuator coupled to the at least two PCB rigid sections, wherein the at least one actuator folds and unfolds the repeatably reconfigurable robot.

BRIEF DESCRIPTION OF THE DRAWINGS

An embodiment of the instant disclosure is illustrated by way of example, and not in way by limitation, in the figures of the accompanying drawings and in which like reference numerals refer to similar elements and in which.

DETAILED DESCRIPTION

Definitions

Figure 1:
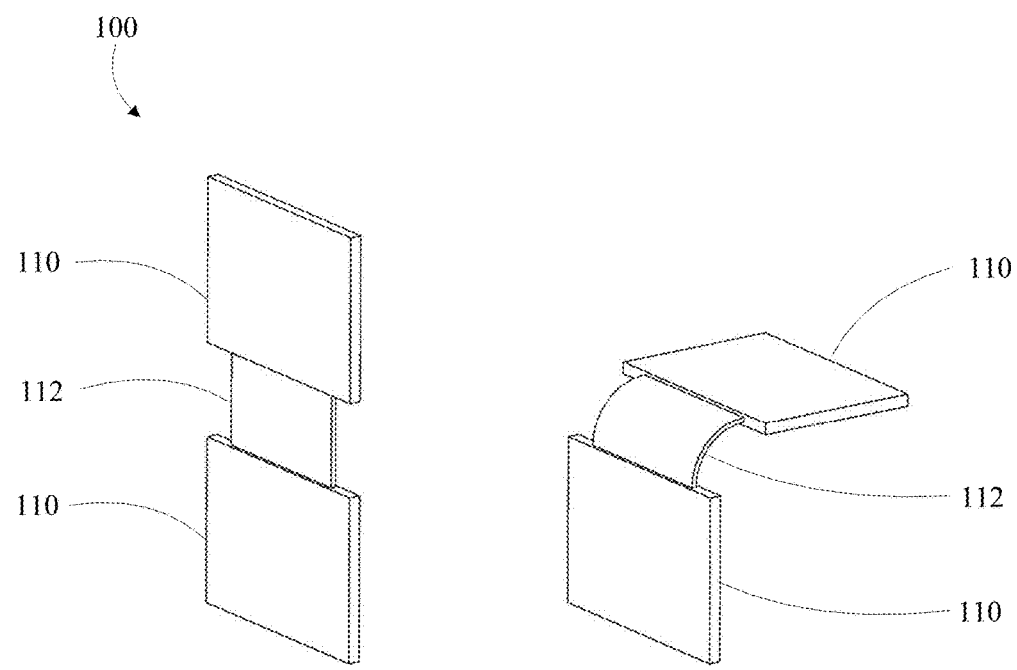
FIG. 1 depicts an example simple rigid flex printed circuit board hinge.

As used herein, the term "repeatably reconfigurable" denotes that after unfolding itself, the device may re-fold its structure, either completely, for flat or compact storage, or partially for example to assume a low-profile stance for maneuvering in confined spaces or lowering its device center of gravity when climbing steep slopes or positioning a payload or sensor such as a microscope. This payload positioning allows the robot to function with fewer moving parts to accomplish its mission objectives.

As used herein, the term "flexible PCB" denotes a printed circuit board which may be bent without affecting its electrical function.

As used herein the term "rigid PCB" denotes a printed circuit board which is mechanically rigid and generally may not be bent without causing damage to the PCB.

As used herein the term "hybrid wheel propeller" denotes a device having multiple rotor blades, each blade having an airfoil with a twist between a leading edge and trailing edge of the blade that when rotated provides thrust perpendicular to the rotation of the hybrid wheel propeller due to an induced air pressure difference between front and back surfaces of its blades due to the rotation. The multiple rotor blades having tips which may form a segmented wheel that provides thrust in a direction parallel to the rotation of the hybrid wheel propeller when in contact with a surface.

As used herein the term "hybrid wheel screw propeller" denotes a device having multiple rotor blades, each blade having a twist between a leading edge and trailing edge of the blade that when rotated provides thrust perpendicular to the rotation of the hybrid wheel screw propeller due to an induced water velocity due to the rotation. The rotor blades may have tips which may form a wheel that provides thrust in a direction parallel to the rotation of the hybrid wheel screw propeller when in contact with a surface.

As used herein the term "actuator" denotes a device that converts a potential energy into kinetic energy. With respect to the wheels, rotors and hybrid wheel propellers an electromechanical actuator converts electrical potential energy to rotational kinetic energy. With respect to the hinges, an electromechanical actuator may convert electrical potential energy to either a rotary kinetic energy or a linear kinetic energy to cause the robot to fold, partially unfold, fully unfold or refold. Also, with respect to the hinges, a spring loaded element may convert spring potential energy to kinetic energy. It is envisioned that an example of the robot may have a winch style electromagnetic actuator (winch actuator) which pulls the robot into one position by tensioning a winch cable and then returns the robot to a second position by use of return springs, other actuators are also envisioned such as a linear solenoid or the like.

As used herein the term "simple hinge" denotes a hinge providing mechanical flexure and electrical signal transmission through the hinge.

As used herein the term "bifurcated hinge" denotes a hinge in which a mechanical function is provided separately from a flexible PCB, e.g. the mechanical flexure function and the electrical signal transmission functions are separated.

Rigid-Flex Printed Circuit Boards

Rigid-flex printed circuit boards (R/F PCBs) are printed circuit boards that contain rigid circuit board sections that are linked together by flexible circuit sections. The flexible sections allow the PCB to be folded into three-dimensional configurations that would not be feasible with a rigid PCB. In addition to allowing the PCB to fold, the flexible sections may provide electrical signals between the rigid sections, through conductive traces in the flexible sections, thus avoiding the need for cables and connectors.

The R/F PCBs utilized with reconfigurable robots provide a mechanical framework for reconfigurable structures in which the rigid portion forms bases and walls and the flexible portions form the joints and ensure a correct geometric construct. Rigid flex PCBs are known in the art.

The capability of the robot to reconfigure itself into folded and unfolded states may have flexible portions that are cycled many times over the life of the R/F PCB. This cycling may result in cracking of the copper traces, thus voiding or degrading electrical transmission of signals or may fatigue the flexible materials resulting in mechanical breakage.

R/F PCB flexible sections may be comprised of copper traces etched onto a polymer film substrate, such as polyimide. The section of thin polymer film allows bending. Various solder mask layers or cover lay polymer film layers may provide insulation, other methods of insulation will be readily apparent to one skilled in the art. Thin layers of glass weaves may be laminated into these flexible joints to decrease the likelihood of mechanical breakage. If the flexible portions have a tight bend radius, they become stiff and copper traces embedded within them may be excessively stressed and fracture. If the hinges have a larger bend radius for less stiffness and longer trace lifetime, their mechanical hinge properties may be diminished.

The hinges may utilize a bifurcated mechanical electrical hybrid construction. This hybrid construction bifurcates the flexible joints into two portions, a short radius of bend mechanical section, which may be constructed using a woven textile, and a long radius of bend electrical section.

This hybrid approach allows the mechanical section to provide the hinge function, while the electrical section has reduced mechanical stress and strain due to long bend radius.

FIG. 1 depicts a simple rigid flex hinge 100, comprising rigid PCB sections 110, and a combined electrical and mechanical flexible hinge portion 112. The flexible hinge forms a joint between two rigid PCB sections. The electrical service lifetime may be shortened depending upon the length of the radii and the bend angle, however, the hinge may serve adequately through several mission cycles.

Figure 2:
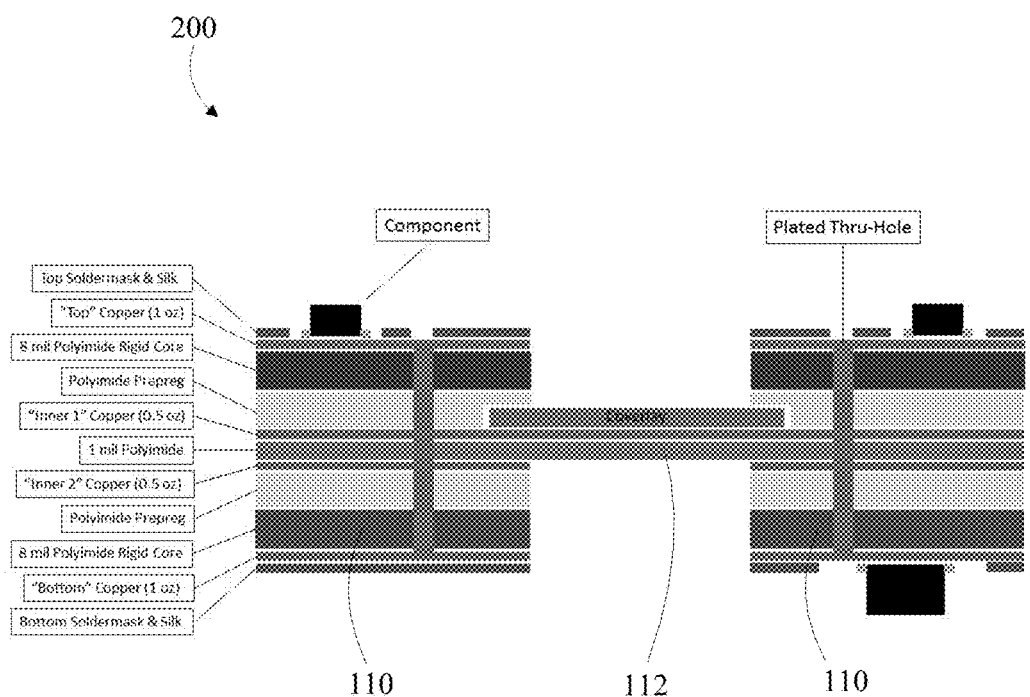
FIG. 2 depicts an example cross-section of the rigid flex printed circuit board hinge.

FIG. 2 depicts an example cross-sectional view 200 of the simple rigid flex hinge of FIG. 1. In this example, rigid PCB sections 110 are connected by a mechanical flexible hinge portion 112. The dimensions shown are representative and have been found to work well, however the disclosure should not be limited to these specific dimensions.

Figure 3:
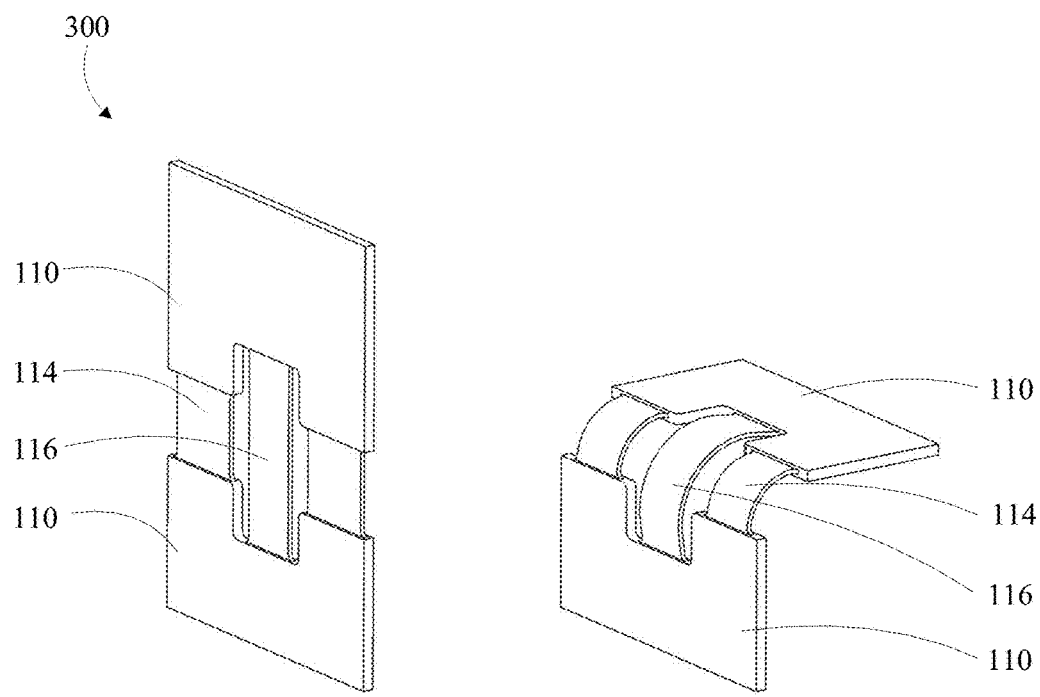
FIG. 3 depicts an example bifurcated rigid flex printed circuit board hinge.

FIG. 3 depicts a bifurcated hinge 300, the hinge has rigid PCB sections 110, short flexible hinge portions 114 and the long electrical portions 116 having longer radii and reduced mechanical stress and strain. The bifurcated hinge decouples the mechanical and electrical portions of the hinge.

Figure 4:
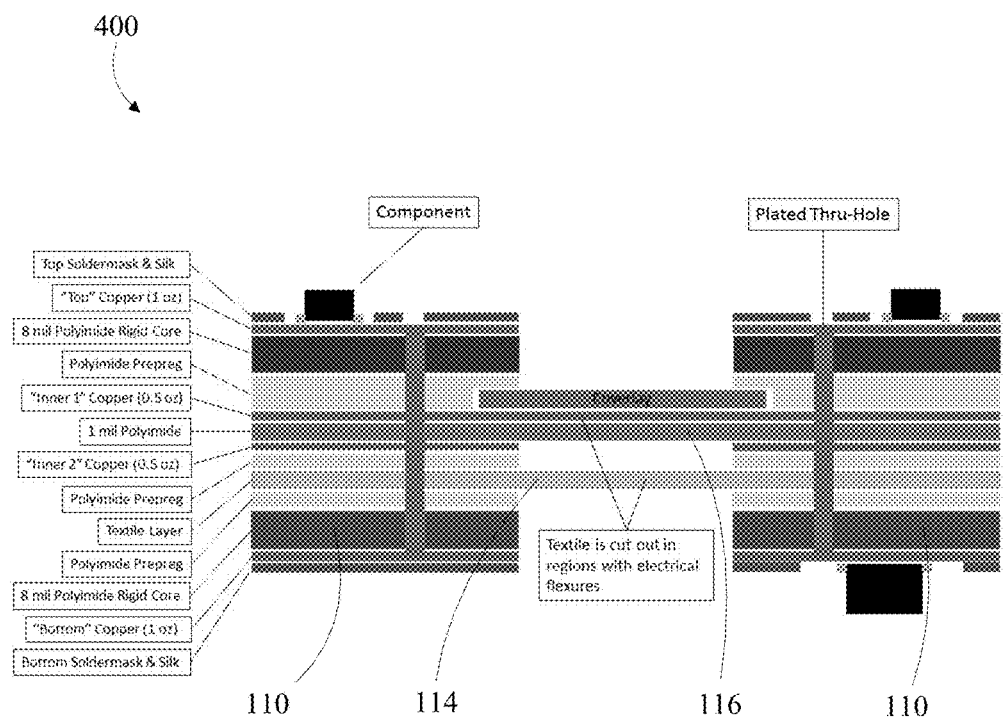
FIG. 4 depicts a first example bifurcated rigid flex printed circuit board cross section.

FIG. 4 depicts an example cross-section 400 of the bifurcated rigid flex PCB of FIG. 3. In this example the textile layer which acts as the mechanical portion of the hinge is located in the middle of the stack. Please note that in the areas where the electrical hinge are located that the mechanical portion of the hinge is ideally removed.

Figure 5:
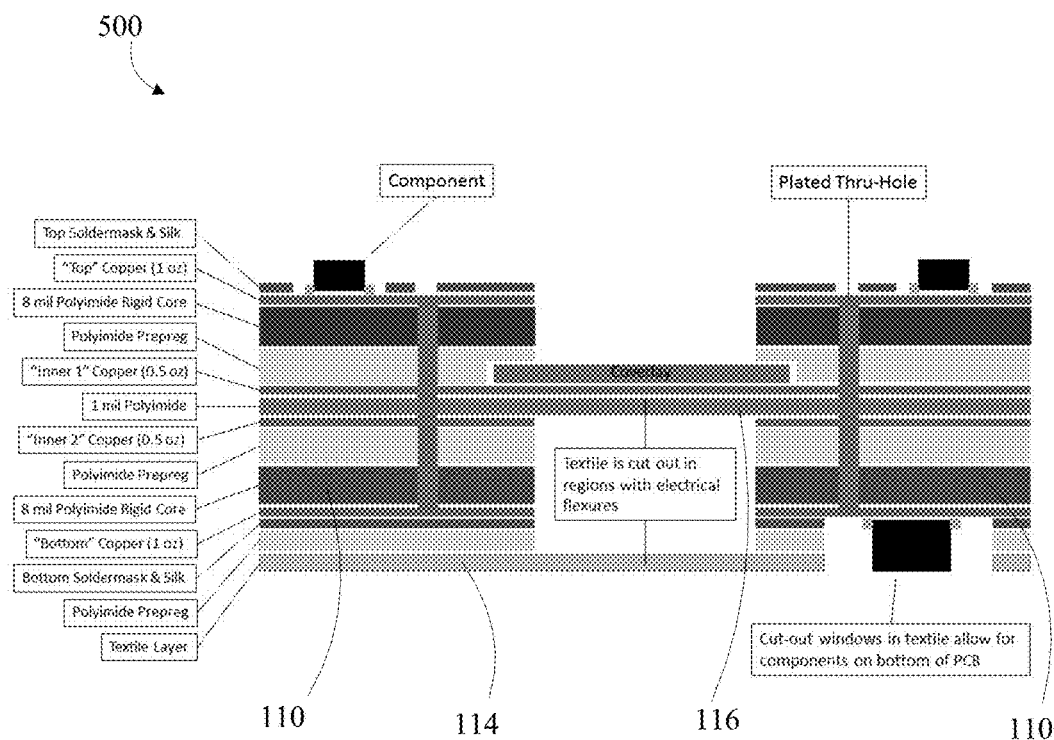
FIG. 5 depicts a second example bifurcated rigid flex printed circuit board cross section.

FIG. 5 depicts another example cross-section 500 of the bifurcated rigid flex PCB of FIG. 3. In this example the textile layer which acts as the mechanical portion of the hinge is located in the middle of the stack. Please note that in the areas where the electrical hinge are located that the mechanical portion of the hinge is removed.

Figure 6:
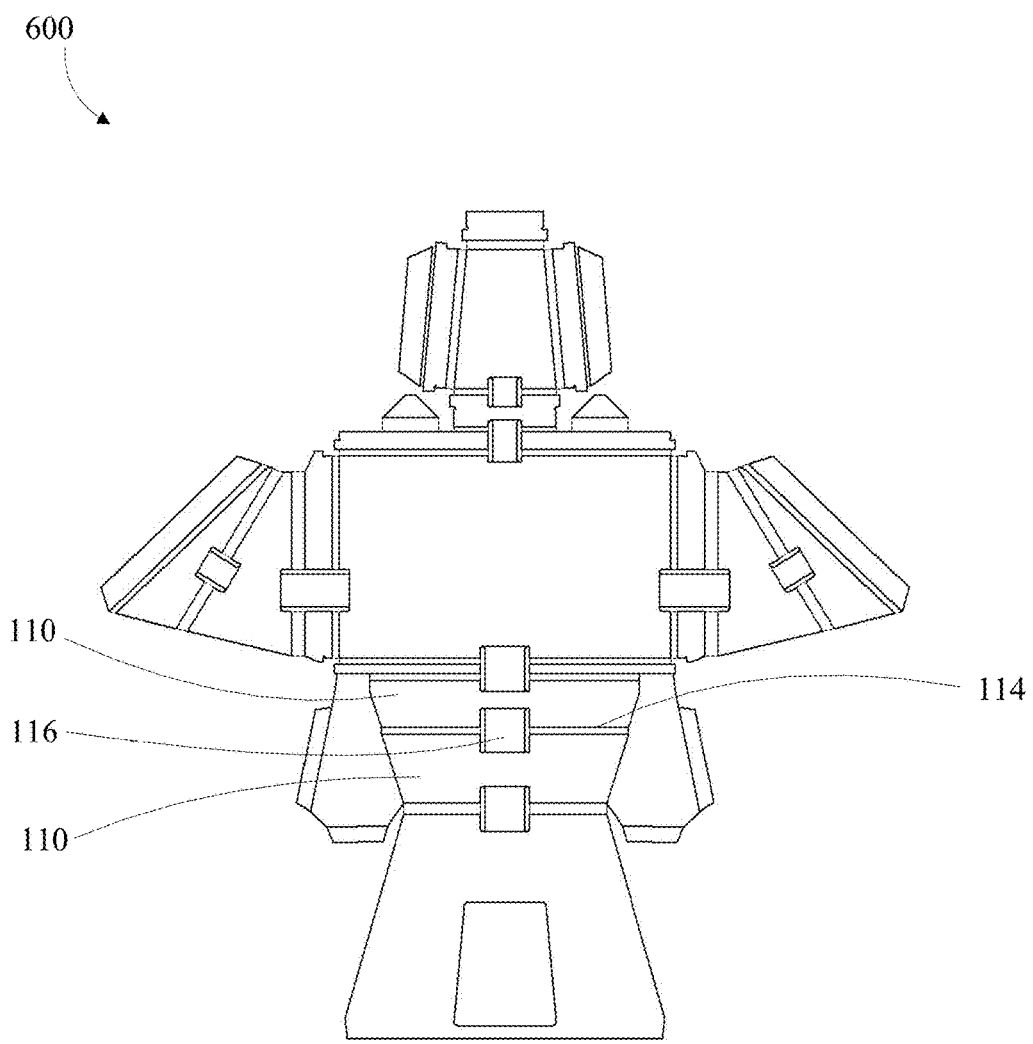
FIG. 6 depicts an example structure having bifurcated rigid flex printed circuit board hinges.

FIG. 6 depicts an example of a bifurcated rigid flex PCB hinges 600. The rigid PCB sections 110 are coupled by the short flexible hinge portions 114 and the long electrical portions 116 having longer radii and reduced mechanical stress and strain.

Woven materials may be laminated into the R/F PCB stack may serve as flexible mechanical joints between rigid PCB sections. This may allow PCB pads on both sides of the R/F PCB, thus allowing components to be mounted on both sides of the rigid boards.

System Description

PUFFER denotes a Pop-Up Flat Folding Explorer Robot, an origami-inspired robot that provides extreme environment access in a lightweight, e.g. less than 100 grams, low volume, e.g. with dimensions comparable to a smartphone, and low cost, e.g. approximately $100 for Earth applications. The repeatably reconfigurable robot has a folding structure composed of a Rigid-Flex printed circuit board (PCB) that may partially or fully unfold itself and partially or fully refold itself. The Rigid-Flex structure allows the repeatably reconfigurable robot to fold flat or compactly for compact storage and pop up, like a pop-up card on command to assume its operational form.

The repeatably reconfigurable robot platform may be set up as a wheeled ground mobility platform, an aerial rotorcraft platform, a hybrid aerial-and-ground platform, and a combined aerial-and-ground platform. It is additionally envisioned that the repeatably reconfigurable robot may be used underwater.

The construction of the repeatably reconfigurable robot may also make it well suited for climbing steep inclines. A partially-folded, low-profile configuration lowers the center of mass, making it more stable on inclines. The lowered center of mass may allow the device to climb steep slopes such as greater than 45 degrees, or may allow the robot to position a payload for use, such as a sensor contact with the surface below or positioning a microscope. The folding capability may allow the robot to accomplish multiple complex movements with a minimum of moving parts.

The device's body is a Rigid-Flex PCB that folds flat or compactly for compact storage, unfolds itself for deployment and may partially or fully fold or refold itself to achieve a mission objective. After unfolding itself, the device may re-fold its structure, either completely, for flat or compact storage, or partially, to assume a low-profile stance for maneuvering in confined spaces. The low-profile stance is may also be used to lower the device center of gravity when climbing steep slopes or positioning a payload such as a microscope for use.

The Rigid-Flex PCB is designed to have impact-absorbing compliance in strategically-selected regions of the structure to allow the repeatably reconfigurable robot to survive large falls. This compliance is achieved through the relative placement of the flexible hinges that allow the body to fold.

The device may utilize thin, motorized wheels attached to its folding structure. These wheels may fold into the structure for flat or compact storage. The repeatably reconfigurable robot may be configured as a four-wheel platform, or a two-wheel-plus-tail platform or utilize any number of wheels and or propellers.

The robots wheels may utilize a flexible material, to further assist with impact-absorption during falls, and may incorporate traction-assisting features such as micro-spines, grousers, and/or leg-like appendages attached to the outside of the wheel.

The repeatably reconfigurable robot's folding structure is lightweight and flexible, making it crash tolerant. This feature allows the ground-mobility repeatably reconfigurable robot to descend from heights by simply falling and surviving the resulting impact. On Mars, this capability may be useful for descending cliffs or into craters with steep walls without complicated descent mechanisms. The device may be thrown or launched into hostile areas, over walls and other barriers, or dropped from quad-rotors and other UAVs.

The repeatably reconfigurable robot may configure itself into a partially-folded, low-profile configuration allowing it to maneuver within confined spaces. This feature may be used to fit beneath rock overhangs on Mars to investigate microclimates and radiation shelters. Or give the device the ability to squeeze underneath gates and doors for covert operations within buildings and compounds and then hide underneath furniture.

The repeatably reconfigurable robot may be utilized in post disaster sites to locate victims or to provide sensor data or within conflict situations to provide reconnaissance.

It is also envisioned that retractors may be placed on both sides of the rigid PCB sections to pull the portions of the PCB to be rotated in a contraction type movement depending upon the movement sought. Those skilled in the art may utilize a multiple different hinge actuation methods envisioned within the scope of the disclosure.

The repeatably reconfigurable robot may carry a number of sensors, including small component cameras, microphones, environment sensors such as temperature, pressure, humidity, radiation sensors and the like, or a folded-optics ground-facing micro-imager.

The repeatably reconfigurable robot may be controlled wirelessly, via radio, either by a human operator in Earth applications, by a parent spacecraft in space exploration applications or may act in an autonomous fashion.

It is envisioned that each of the electrical components may be directly mated to either the rigid PCB or the flex PCB, the reason for this is to decrease the likelihood of a connection issue between components.

It is also envisioned that due to the small size of the repeatably reconfigurable robot decontamination, cleaning and dehydration would be significantly less complex than performing the same operation on a larger robot.

Two Wheeled Repeatably Reconfigurable Robots

Figure 7:
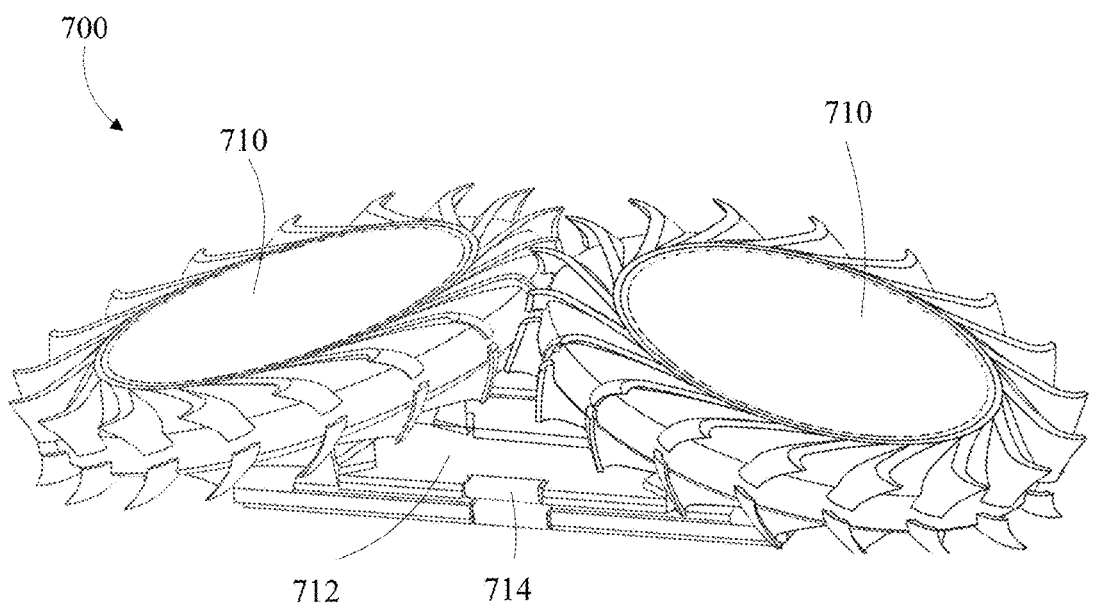
FIG. 7 depicts a first example two wheeled reconfigurable robot in a folded configuration in accordance with an embodiment of the disclosure.

FIG. 7 depicts an example wheeled configuration 700 in which the repeatably reconfigurable robot would be stacked in a flat or compact configuration and would pop up so that the wheels 710 which are rotatably coupled to the rigid PCB 712 touch the ground in a pop up configuration. The rigid PCBs 712 have flexible hinges 714 providing mechanical and electrical coupling which are coupled to the rigid PCBs and are actuated by an actuator, within the wheels 710 having a winch actuator and return spring, coupling the rigid PCBs across the flexible hinges.

Figure 8:
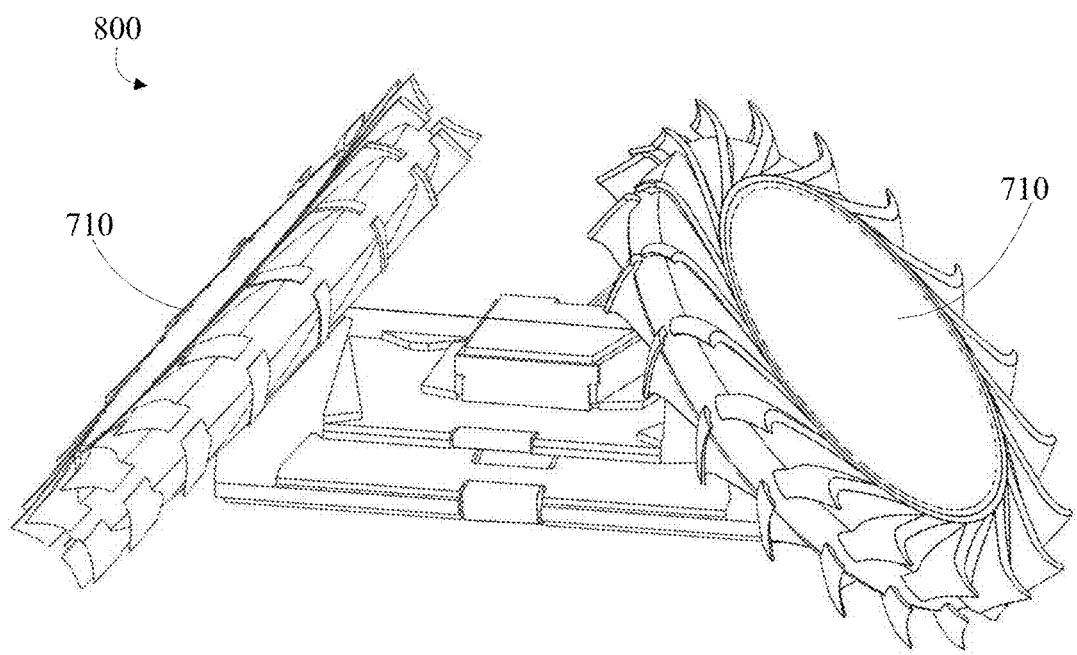
FIG. 8 depicts the first example two wheeled reconfigurable robot in a partially unfolded configuration in accordance with an embodiment of the disclosure.

FIG. 8 depicts an example wheeled configuration 800 in a sprawled configuration in which the robot is partially folded. The wheels 710 in this configuration are functional and allow the robot to move with a low center of gravity and to be able to fit into tight enclosures. In this example the structure is folded with a winch actuator, which pulls the two wheels together by tensioning the winch cable. The structure unfolds via spring-loaded elements (return springs) inside the structure when tension is released by the winch actuator. After unfolding itself, the device may re-fold its structure, either completely, for flat or compact storage, or partially, to assume a low-profile stance for maneuvering in confined spaces. The low-profile stance may for example also be used to lower the device center of gravity when climbing steep slopes or position a payload for use.

Figure 9:
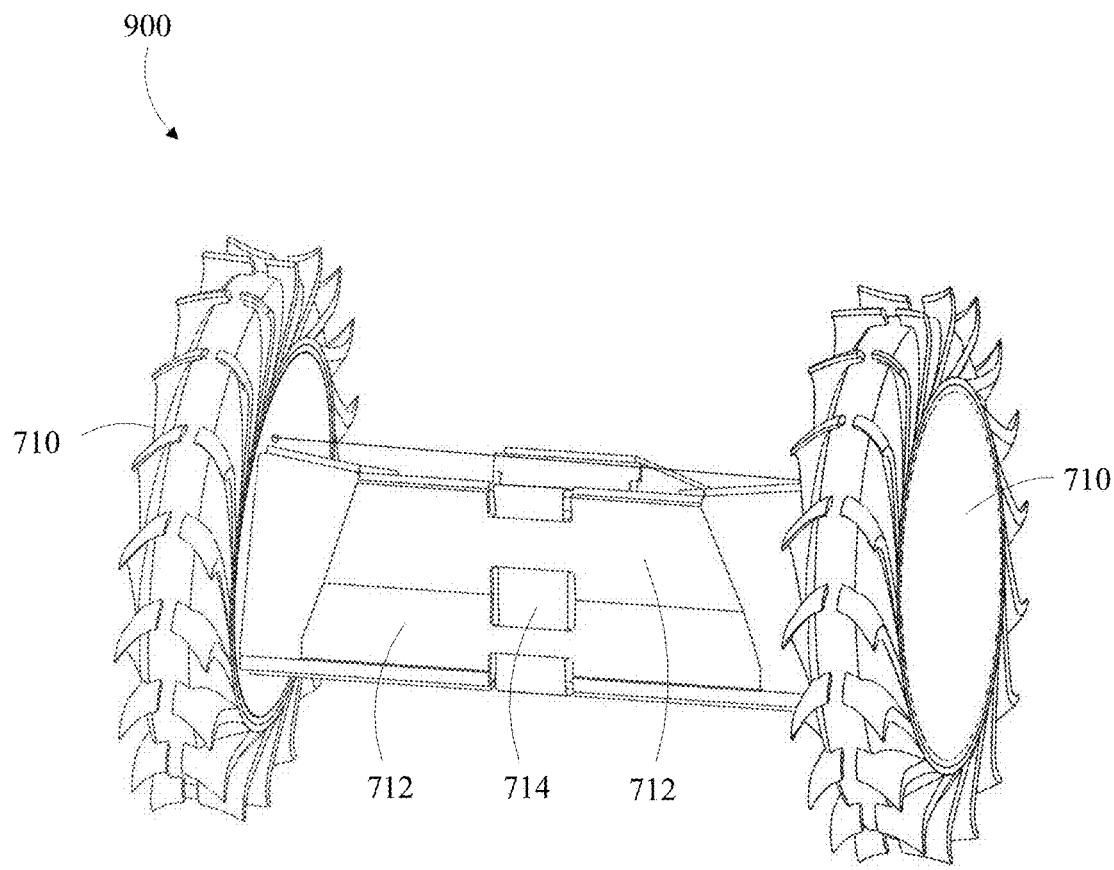
FIG. 9 depicts the first example two wheeled reconfigurable robot in a fully unfolded configuration in accordance with an embodiment of the disclosure.

FIG. 9 depicts an example wheeled configuration 900 in a fully unfolded configuration. A winch actuator located within the wheels 710 pull a winch cable unfolding the robot against the force of a return spring. The rigid PCBs 712 provide structural support for the robot and the flexible hinges 714 provide electrical connection between the boards.

The robots in these examples may be flattened either completely or partially or popped up by the use of actuators, this capability allows the robot to be used in modes and missions where the use of a fully expanded robot may not function.

In a two wheeled configuration the wheels may be mounted in such a way that the robot may either drive when flipped over, or flip itself over, thus eliminating the need to land in a particular orientation.

Figure 10:
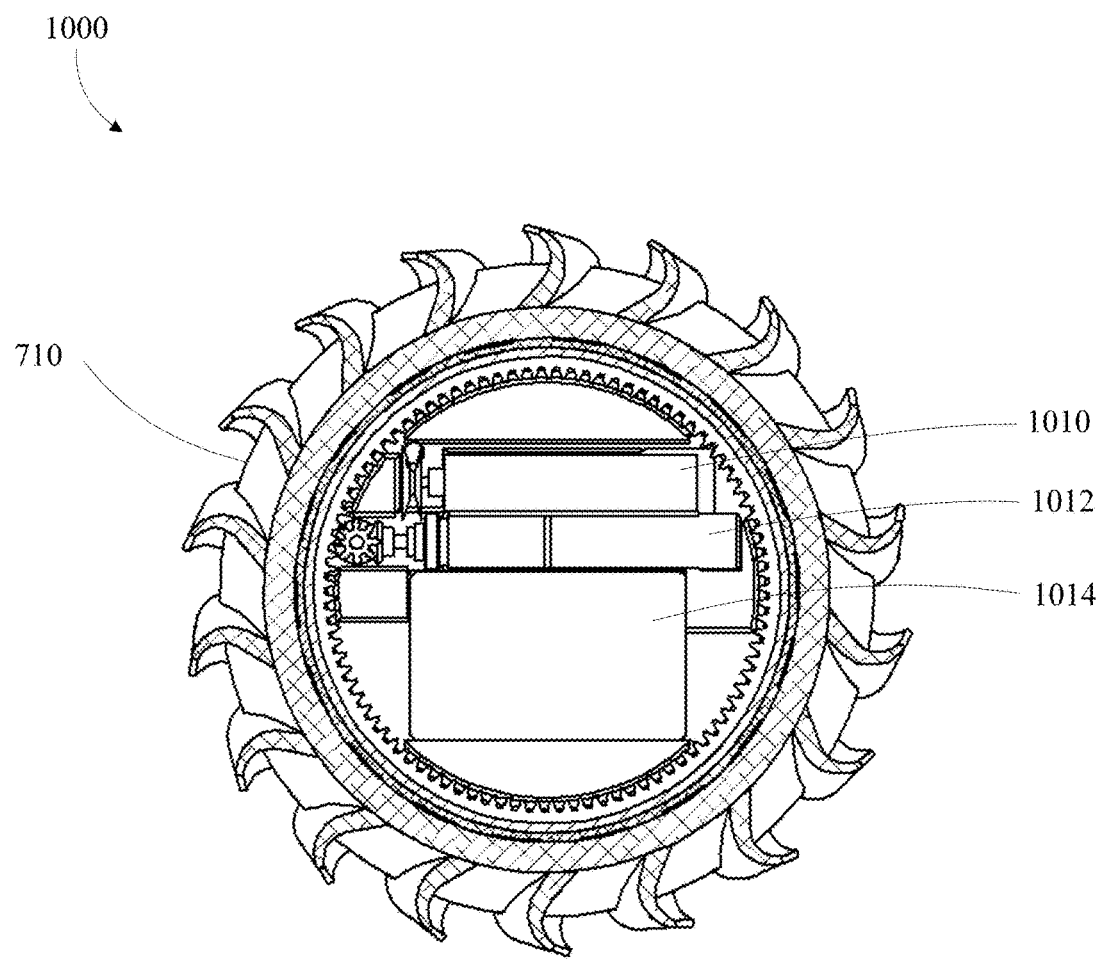
FIG. 10 depicts an example wheel containing a winch actuator, drive components and a battery in accordance with an embodiment of the disclosure.

FIG. 10 shows an internal view of wheels 710 from FIGS. 7-9 1000. The tires contain the winch actuator 1010 that provides the actuation to unfold the robot. The drive motor 1012 is coupled to an internal planetary gear in the wheel 710. The winch actuator 1010 and the drive motor 1012 are both supplied with power from battery 1014. The figure shows a cut-away with a motorized electromechanical winch (winch actuator) inside wheel. This winch actuator tensions the winch cable shown to pull two opposing wheels together (to fold the robot). When the winch actuator releases tension, a return spring in the structure unfolds the structure. Winch actuator is shown at very top of wheel, above wheel drive motor and battery.

Stackable Repeatably Reconfigurable Robots

Figure 11:
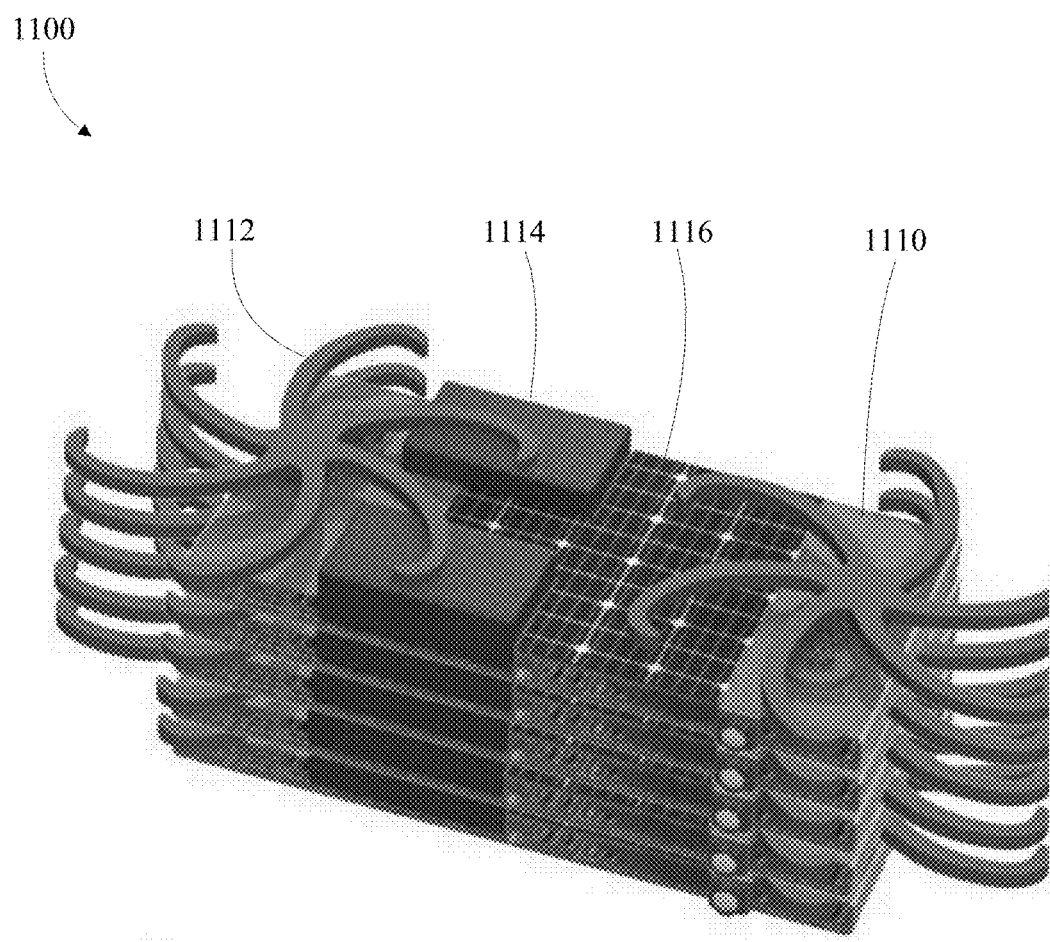
FIG. 11 depicts an example two wheeled robot in a stacked configuration in accordance with an embodiment of the disclosure.

FIG. 11 depicts a series of repeatably reconfigurable two wheeled robots 1100 that are stacked upon one another for storage and possibly charging. The device may be stacked and restacked. In space missions, such as Mars rovers, a multitude of repeatably reconfigurable robots, stacked in a small compartment on the rover may be carried and deployed to explore high science-return extreme terrains that the parent spacecraft itself is not designed for due to high risk of loss. In this example a rigid PCB 1110 has electronics and motors attached to it. The motors may be brushless DC and the like. Additionally, the rigid PCB is coupled to wheels 1112 and sensors. Flexible hinges are coupled to the rigid PCB, in this example the batteries 1114 and solar cells 1116 are depicted. The robots in these examples may be flattened either completely or partially, or popped up by the use of actuators, this capability allows the robot to be used in modes and missions where the use of a fully expanded robot may not function.

Four Wheeled Repeatably Reconfigurable Robots

Figure 12:
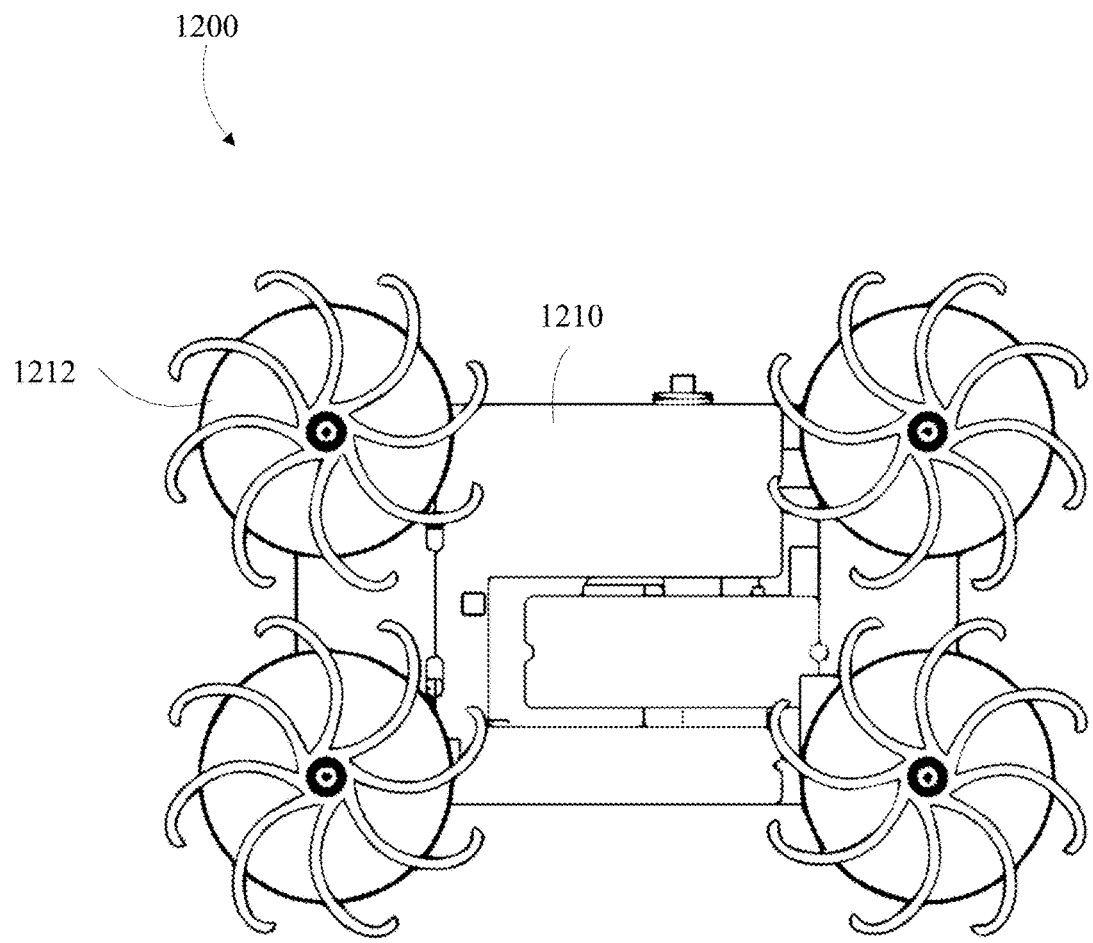
FIG. 12 depicts a top view of a four wheeled robot utilizing spring actuation in a folded configuration in accordance with an embodiment of the disclosure.

FIG. 12 depicts a mechanical structure 1200 of a four wheeled example in which the wheels 1212 are rotationally coupled to the rigid PCB 1210. In this example, the robot may be either spring loaded for manual unfolding or electromechanically actuated for unfolding.

Figure 13:
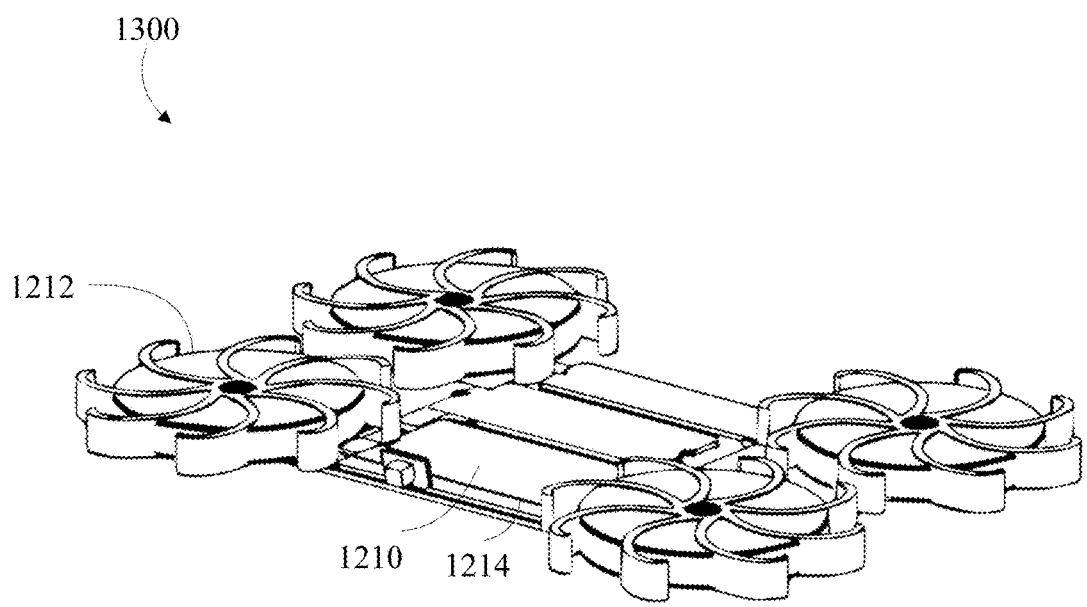
FIG. 13 depicts a second example of a four wheeled robot utilizing a winch actuator in a folded configuration in accordance with an embodiment of the disclosure.

FIG. 13 depicts an example of a winch actuated, mechanical structure 1300 of a four wheeled example of FIG. 12. The wheels 1212 are rotationally coupled to the rigid PCB 1210, the winch cable 1214 connects two of the wheels 1212. In this example the winch cable runs across top of the robot.

Figure 14:
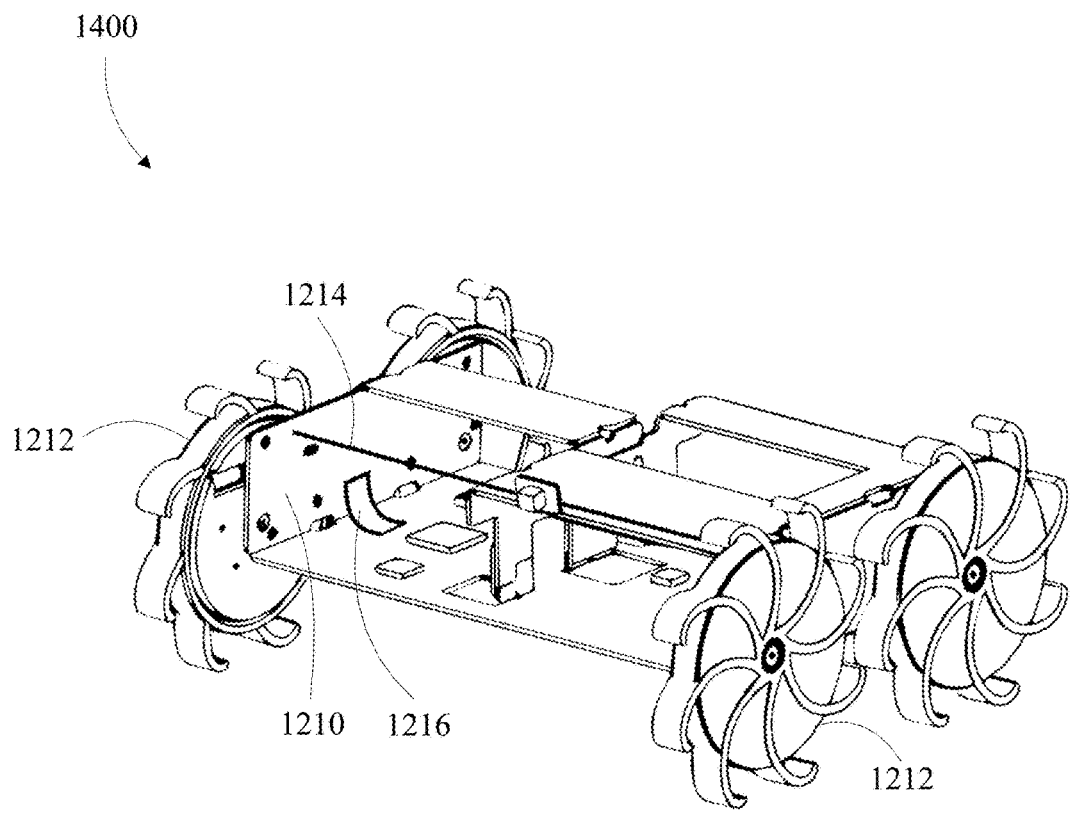
FIG. 14 depicts the second example of a four wheeled robot utilizing a winch actuator in an unfolded configuration in accordance with an embodiment of the disclosure.

FIG. 14 depicts an example of the winch actuated, mechanical structure 1400 of a four wheeled example of FIG. 13 in a fully unfolded configuration. The wheels 1212 are rotationally coupled to the rigid PCB 1210, the winch cable 1214 connects two of the wheels 1212 and the return spring 1216 returns the robot to a folded configuration when the tension on the winch cable 1214 is released. In this example the winch cable runs across top of the robot and the return spring is shown on the bottom of structure.

Figure 15:
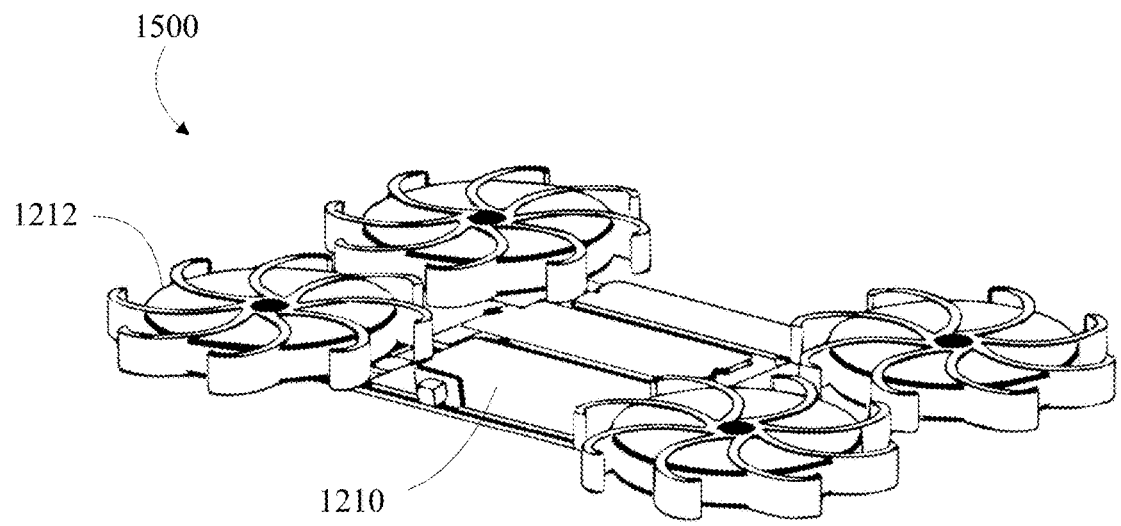
FIG. 15 depicts a third example of a four wheeled robot utilizing spring actuation in a folded configuration in accordance with an embodiment of the disclosure.

FIG. 15 depicts an example of a spring loaded manually actuated, mechanical structure 1500 of a four wheeled example of FIG. 12. The wheels 1212 are rotationally coupled to the rigid PCB 1210. This example does not include a winch for actuated fold and is spring-loaded release only.

Figure 16:
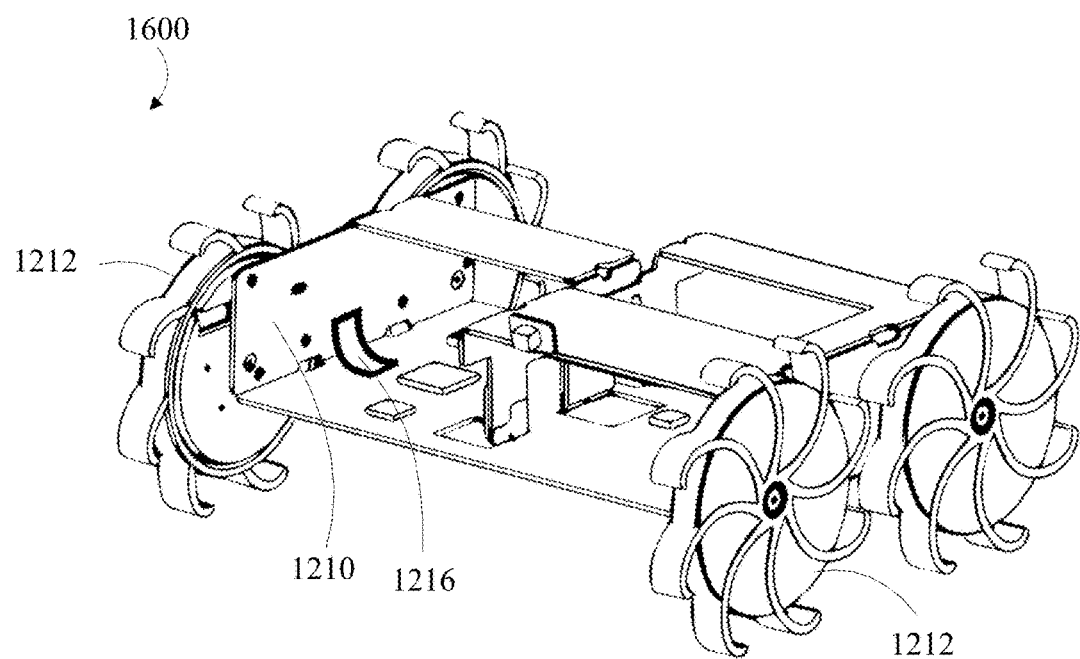
FIG. 16 depicts the third example of a four wheeled robot utilizing spring actuation in an unfolded configuration in accordance with an embodiment of the disclosure.

FIG. 16 depicts an example of the spring loaded manually actuated, mechanical structure 1600 of a four wheeled example of FIG. 15 in a fully unfolded configuration. The wheels 1212 are rotationally coupled to the rigid PCB 1210 and the return spring 1216 returns the robot to a folded configuration unfixed from the unfolded configuration.

In a four-wheel configuration, the robot may be able to drive with either its bottom side up or its top side up. In a two-wheel-plus-tail configuration, the robot is designed to be able to right itself in the event that it lands inverted.

Hybrid Aerial and Ground Repeatably Reconfigurable Robots

Figure 17:
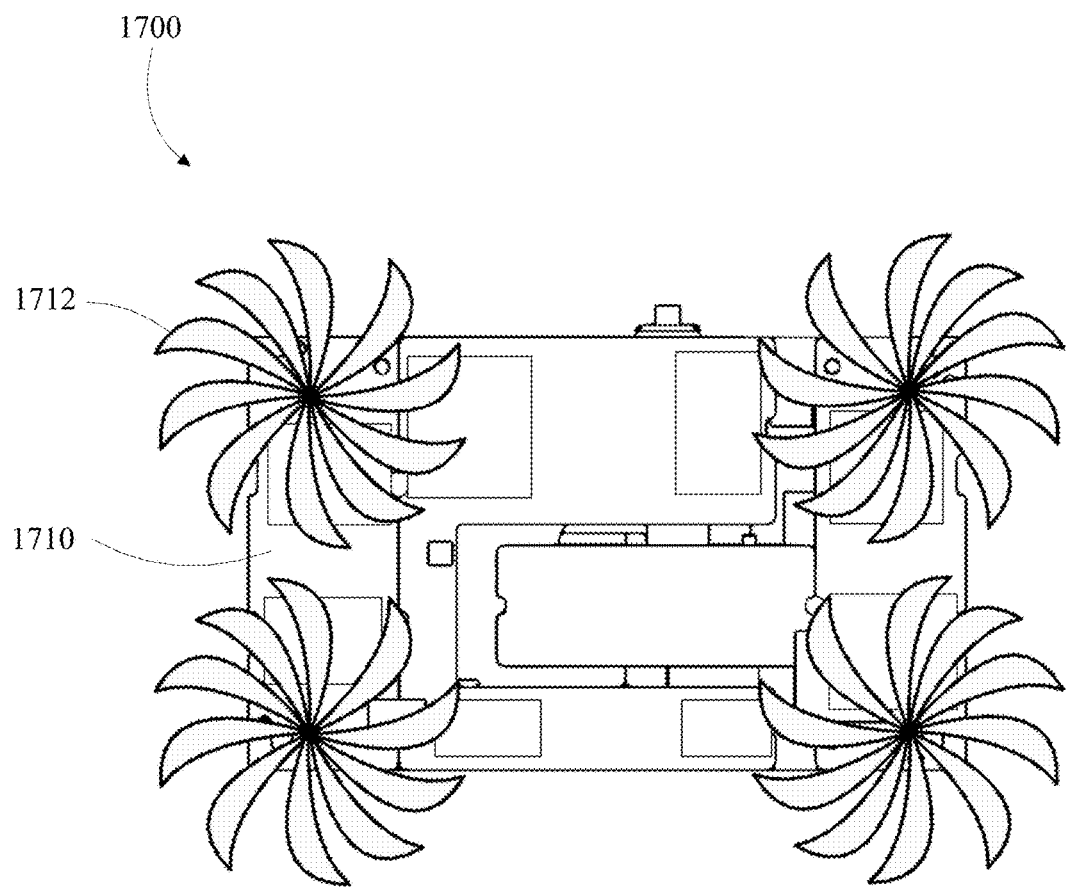
FIG. 17 depicts an example hybrid flying and crawling reconfigurable robot in accordance with an embodiment of the disclosure.

FIG. 17 depicts the aerial and hybrid aerial-and-ground example 1700. In this example the rigid portion of the PCB is indicated by element 1710. Actuation may be by a winch actuator and return spring setup, direct actuation on each folding joint or a spring loaded to fixed position setup. The propellers/propeller-wheels are depicted by 1712. In an aerial configuration the repeatably reconfigurable robot would lie flat or compact for flying. In a hybrid aerial-and-ground configuration, the rigid portions with the propellers would be canted to contact the ground and drive the vehicle in a wheeled fashion. In the wheeled configuration, the Rigid-Flex pop-up structure deploys actuated high-traction wheels to assume a drivable form.

In the hybrid aerial-and-ground configuration, the pop-up structure would deploy a set of modified propellers that may be angled towards the ground to act as wheels for ground mobility. The hybrid aerial-and-ground platform may exploit the advantages of both mobility methods. The platform for example may enter compounds by flying over walls or through structures and then land and assume a much stealthier ground-mobility configuration to crawl behind or beneath foliage to conduct surveillance.

The device's chassis is a Rigid-Flex Printed Circuit Board (R/F PCB) that integrates the robot's electronics directly into the folding structure. The folding PCB structure may allow sufficient surface area for mounting a variety of chip-scale sensors. Example sensors may comprise thin component cameras, microphones, environment sensors such as temperature, pressure, humidity, radiation sensor and the like, or ground-facing microscopes. The available surface area may also be used to attach solar arrays, which may extend operating time.

The repeatably reconfigurable robot may be powered by small batteries mounted directly to the Rigid-Flex structure. Additional power may be obtained from solar arrays may also mounted to the Rigid-Flex structure.

Soldiers may carry multiple repeatably reconfigurable robots and utilize them to explore dangerous areas from a safe distance. Likewise, emergency personnel may carry repeatably reconfigurable robots to dispatch these into otherwise inaccessible or dangerous areas to search for survivors.

In a combined aerial and wheeled configuration, the pop-up structure may deploy a set of propellers, such as four propellers in a quad-rotor configuration, for aerial mobility and may deploy actuated high-traction wheels to assume a drivable form. In this example, the structure adjusts its configuration to enable the wheels or propellers depending on which form of mobility is sought.

Combined Aerial and Ground Repeatably Reconfigurable Robots

Figure 18:
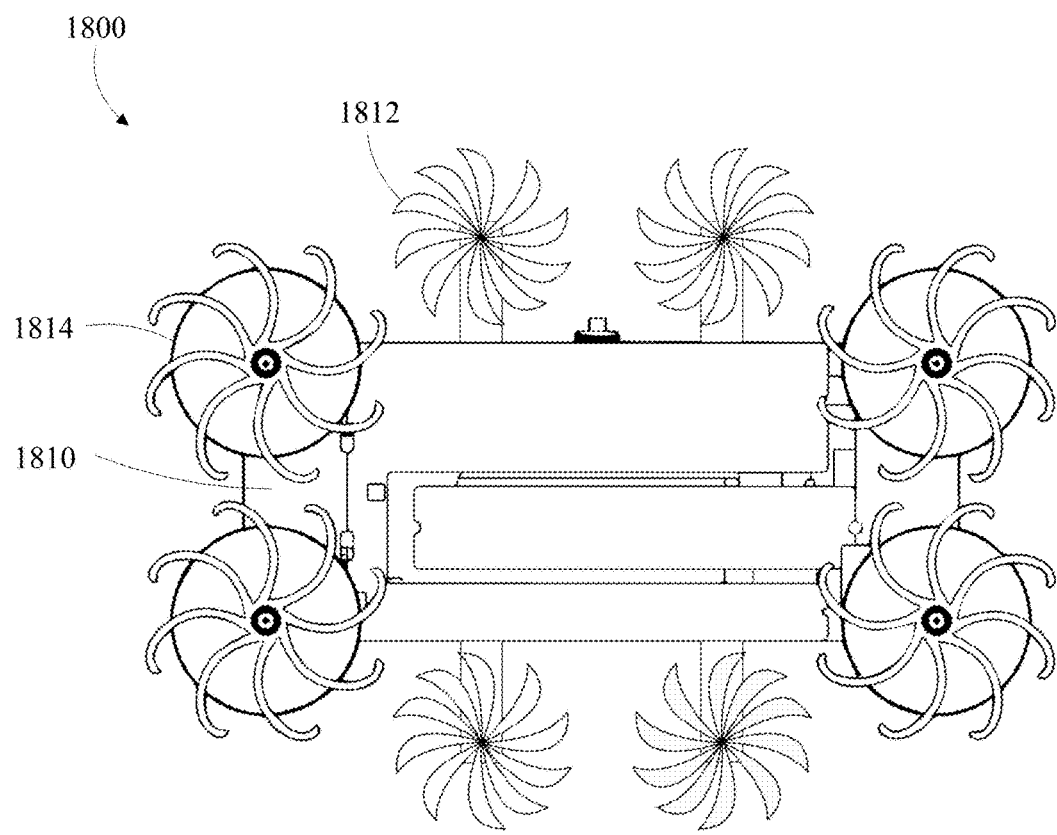
FIG. 18 depicts an example flying and crawling reconfigurable robot in accordance with an embodiment of the disclosure.

FIG. 18 depicts an example of the combined aerial and wheeled configuration 1800. In this configuration the rigid PCB 1810 supports the propellers 1812 directly as the motor that they are coupled to is itself coupled to the rigid PCB. The motor may be a brushless DC motor, a stepper motor, an AC motor and the like. The mechanical and electrical flexible hinge is connected to the main board and the side boards which are coupled to the wheels 1814. The side board is repeatably reconfigurable with respect to the main board by way of actuators which may be an electromechanical hinge, winch actuator and return spring setup, direct actuation on each folding joint or a spring loaded and fixed position setup. Additionally, the side boards may be partially folded or unfolded to assume a low profile for movement within small spaces and the like.

Hybrid Submersible and Ground Repeatably Reconfigurable Robots

Figure 19:
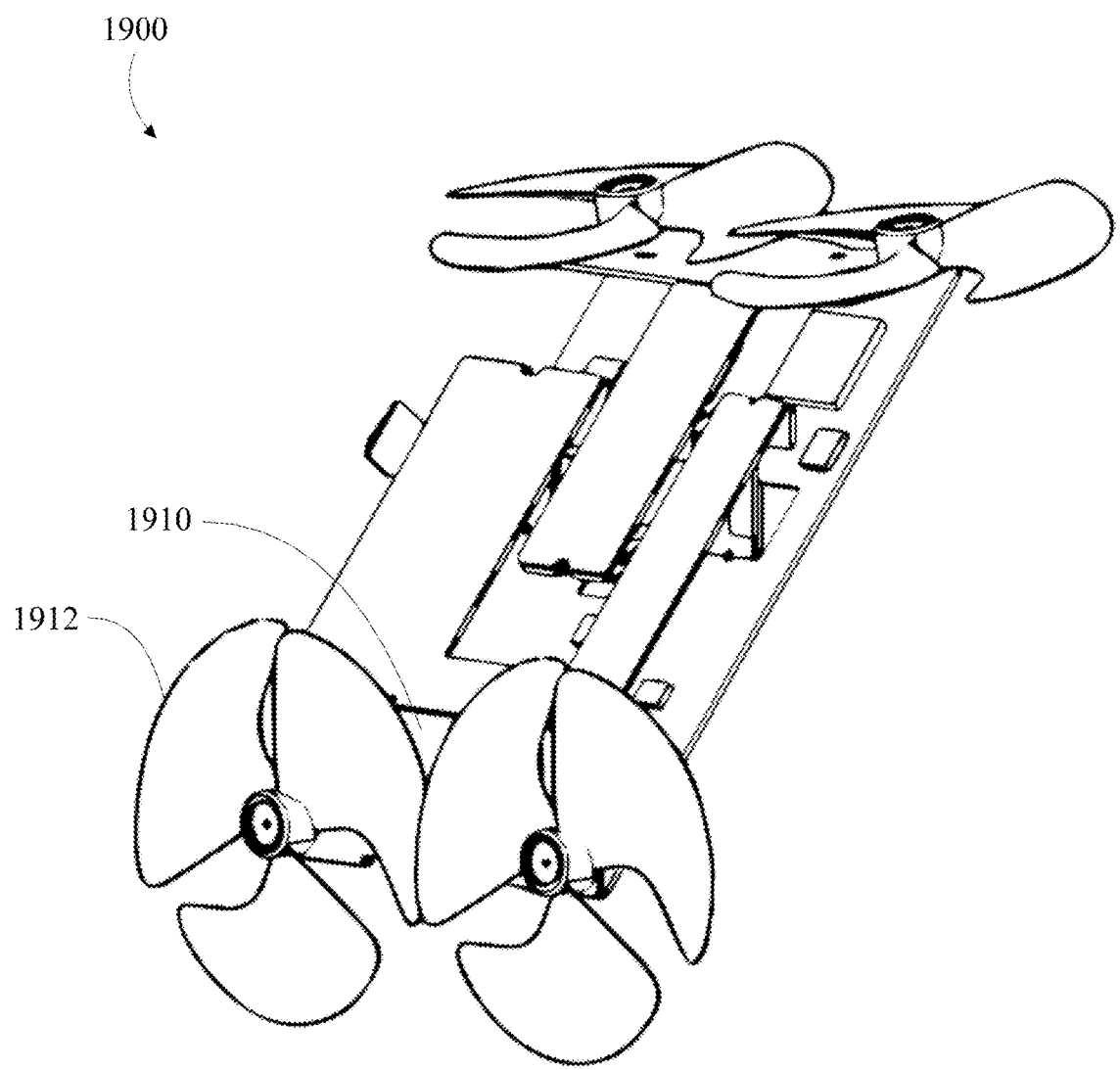
FIG. 19 depicts an example submersible and crawling reconfigurable robot in accordance with an embodiment of the disclosure.

FIG. 19 depicts the hybrid submersible-and-ground example 1900. In this example the rigid portion of the PCB is indicated by element 1910. Actuation may be by a winch actuator and return spring setup, direct actuation on each folding joint or a spring loaded to fixed position. The propellers/propeller-wheels are depicted by 1912. In a submersible configuration the repeatably reconfigurable robot would lie with the propellers slightly canted for underwater transport. In the submersible configuration, the rigid portions with the propellers would be canted for diving. In the wheeled configuration, the Rigid-Flex pop-up structure deploys actuated high-traction wheels to assume a drivable form.

It is envisioned that the hybrid submersible and ground robot may be used in underwater wreck or disaster investigation.

Multiple Cooperative Repeatably Reconfigurable Robots

FIG. 11 depicts a series of repeatably reconfigurable two wheeled robots 1100 that are stacked upon one another for storage and possibly charging. During use it is envisioned that the robots may work in a cooperative fashion for sensing, computing, communication and mobility.

With respect to sensing, it is envisioned that a group of the robots may be deployed, each robot sending information back to a base station in a distributed sensing net. The robots would form a mobile, wireless sensor network, spatially distributed, moving and able to send data back to the base station. Examples may include seismic data, snow depth data, temperature data and the like.

With respect to computing, it is envisioned that a group of the robots may be deployed, form an individual node and share information processing like a multi-node distributed computer.

With respect to communications it is envisioned that a group of the robots may form a communications net so that data collected by robots far from the base station may be relayed by intermediate robots along a communications web formed by the robots back to the base station.

With respect to mobility it is envisioned that a group of the robots may cooperate in a fashion similar to ants, such that crevices may be crossed by the formation of linked robot bridges or a robot may be lowered by another robot from a ledge in a self-organized fashion.

Hinge Actuation

FIGS. 9 and 10 depict a winch actuator located within the wheels 710 which pull a winch cable unfolding the robot against the force of a return spring. The rigid PCBs 712 provide structural support for the robot and the flexible hinges 714 provide electrical connection between the boards.

FIG. 16 depicts an example of spring loaded actuation. The wheels 1212 are rotationally coupled to the rigid PCB 1210 and the return spring 1216 returns the robot to a folded configuration unfixed from the unfolded configuration.

Figure 20:
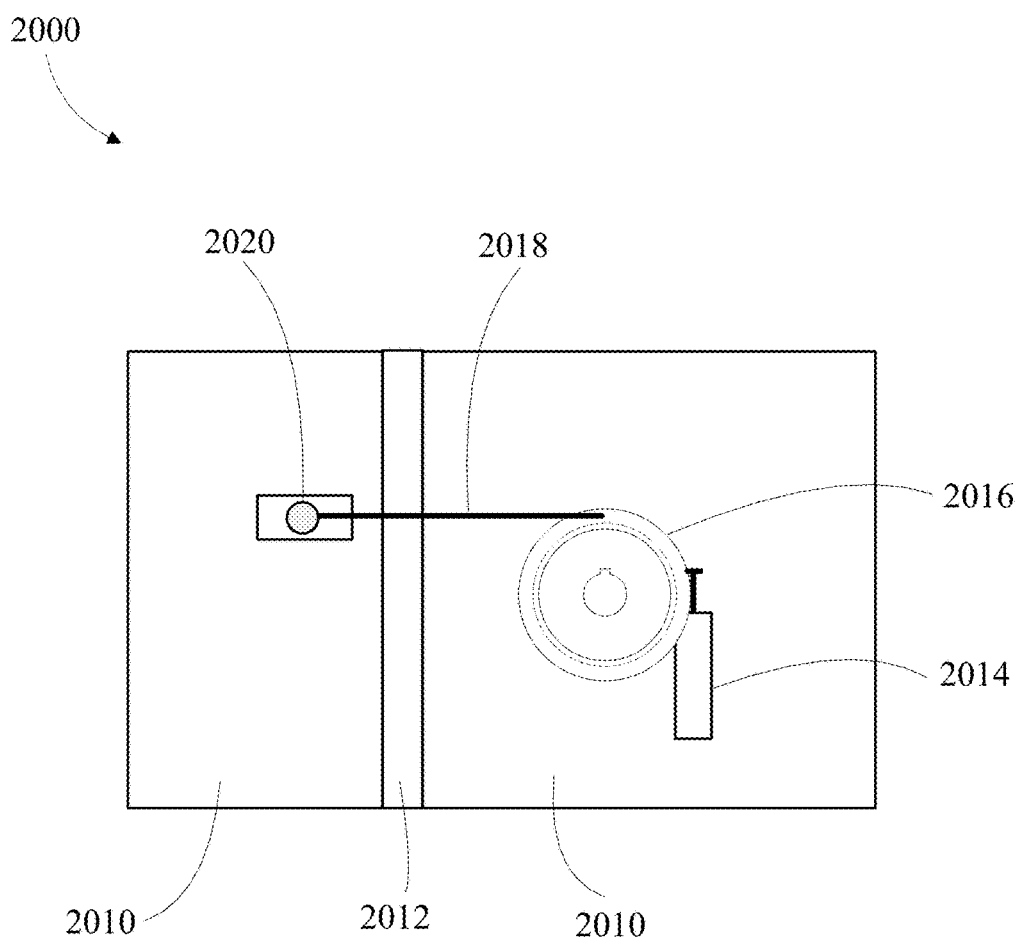
FIG. 20 depicts an example direct electromechanical actuator in accordance with an embodiment of the disclosure.

FIG. 20 depicts an example of a direct actuation hinge 2000. Rigid PCB portions 2010 are connected through flexible PCB portion 2012. In this example an electrical motor 2014 rotates a gear 2016 which is coupled via a rigid link 2018 to an actuation horn 2020. In this example the electrical motor 2014 rotates, which rotates the gear 2016, pulling or pushing the rigid link 2018, thus pulling or pushing the actuation horn 2020 and either folding or unfolding the hinge.

Equivalents, Extensions, Alternatives and Miscellaneous

Example embodiments that relate to repeatably reconfigurable robots are thus described. In the foregoing specification, embodiments of the present disclosure have been described with reference to numerous specific details that may vary from implementation to implementation. Thus, the sole and exclusive indicator of what may be the invention, and is intended by the applicants to be the invention, may be the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A repeatably reconfigurable robot, comprising:
   at least two printed circuit board (PCB) rigid sections;
   at least one PCB flexible section coupled to the at least two PCB rigid sections;
   at least one wheel rotatably coupled to at least one of the at least two PCB rigid sections; and
   at least one actuator coupled to the at least two PCB rigid sections, wherein the at least one actuator folds and unfolds the repeatably reconfigurable robot.

2. The repeatably reconfigurable robot of claim 1 wherein the repeatably reconfigurable robot partially folds to a low profile state.

3. The repeatably reconfigurable robot of claim 1 wherein the repeatably reconfigurable robot partially unfolds to a low profile state.

4. The repeatably reconfigurable robot of claim 1 wherein the repeatably reconfigurable robot is stackable.

5. The repeatably reconfigurable robot of claim 1 further comprising at least one sensor coupled to at least one of the at least two PCB rigid sections.

6. The repeatably reconfigurable robot of claim 1 wherein the at least one actuator is an electromechanical winch.

7. The repeatably reconfigurable robot of claim 1 wherein the at least one actuator is spring loaded.

8. The repeatably reconfigurable robot of claim 1 wherein the at least one actuator is a direct electromechanical actuator.

9. The repeatably reconfigurable robot of claim 1 further comprising at least one motor coupled to the at least one wheel.

10. The repeatably reconfigurable robot of claim 1, wherein the at least one PCB flexible section comprises a bifurcated hinge.

11. The repeatably reconfigurable robot of claim 10, wherein the bifurcated hinge comprises a mechanical section of a first radius and an electrical section of a second radius, longer than the first radius.

12. The repeatably reconfigurable robot of claim 11, wherein the mechanical section comprises a woven textile.

13. The repeatably reconfigurable robot of claim 1 comprising two wheels.

14. The repeatably reconfigurable robot of claim 1, wherein one of the at least one actuator folds the repeatably reconfigurable robot and another one of the at least one actuator unfolds the repeatably reconfigurable robot.

15. The repeatably reconfigurable robot of claim 1, wherein a winch actuator folds the repeatably reconfigurable robot and a spring actuator unfolds the repeatably reconfigurable robot.

16. The repeatably reconfigurable robot of claim 15, wherein the winch actuator and the spring actuator are located within the at least one wheel.

17. The repeatably reconfigurable robot of claim 1, wherein the at least one wheel comprises four wheels.

18. The repeatably reconfigurable robot of claim 1 further comprising at least one propeller rotatably coupled to at least one of the at least two PCB rigid sections.

19. The repeatably reconfigurable robot of claim 18 further comprising at least one first motor coupled to the at least one propeller and at least one second motor coupled to the at least one wheel.

20. The repeatably reconfigurable robot of claim 18, wherein the at least one propeller is a hybrid wheel propeller.

21. The repeatably reconfigurable robot of claim 18, wherein the at least one propeller is a hybrid wheel screw propeller.

* * * * *